(12) United States Patent
Joshi et al.

(10) Patent No.: US 11,442,788 B2
(45) Date of Patent: Sep. 13, 2022

(54) LOCATING SYSTEM RESOURCES

(71) Applicant: HEWLETT PACKARD ENTERPRISE DEVELOPMENT LP, Houston, TX (US)

(72) Inventors: Mayuri Ravindra Joshi, Bangalore (IN); Sagar Ratnakara Nikam, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/797,509

(22) Filed: Feb. 21, 2020

(65) Prior Publication Data

US 2020/0278887 A1 Sep. 3, 2020

(30) Foreign Application Priority Data

Feb. 28, 2019 (IN) .............................. 201941007992

(51) Int. Cl.
  *G06F 9/50* (2006.01)
  *G06F 9/38* (2018.01)

(52) U.S. Cl.
  CPC .......... *G06F 9/5072* (2013.01); *G06F 9/3891* (2013.01); *G06F 9/5027* (2013.01)

(58) Field of Classification Search
  CPC .... G06F 9/5072; G06F 9/5027; G06F 9/3891; G06F 2209/502; G06F 9/5061
  See application file for complete search history.

(56) References Cited

U.S. PATENT DOCUMENTS

| | | | |
|---|---|---|---|
| 9,509,759 B2 | 11/2016 | Musial et al. | |
| 2006/0171538 A1* | 8/2006 | Larson | H04W 64/003 380/270 |
| 2012/0144448 A1 | 6/2012 | Gunawardena et al. | |
| 2013/0007734 A1* | 1/2013 | McCloy | H04L 41/0893 718/1 |
| 2018/0013654 A1* | 1/2018 | Kapadia | H04L 41/12 |
| 2018/0191733 A1* | 7/2018 | Kundu | H04L 63/107 |

OTHER PUBLICATIONS

Albeshri et al., "GeoProof: Proofs of Geographic Location for Cloud Computing Environment", 32nd International Conference on Distributed Computing Systems Workshops, 2012, pp. 506-514.

Eskandari et al., "VLOC: An Approach to Verify the Physical Location of a Virtual Machine in Cloud", IEEE 6th International Conference on Cloud Computing Technology and Science, 2014, pp. 86-94.

(Continued)

*Primary Examiner* — Sisley N Kim
(74) *Attorney, Agent, or Firm* — Hewlett Packard Enterprise Patent Department

(57) ABSTRACT

Example implementations relate to locating cloud system resources. A system can comprise a processor and a non-transitory memory resource storing machine readable instructions to receive a global positioning system (GPS) coordinate for hardware resources positioned at a plurality of geographic locations, tag resources stored at each of the plurality of geographic locations with a corresponding GPS coordinate, and determine a corresponding geographic location of a portion of the tagged resources based on extracted GPS coordinates for the portion of the tagged resources.

20 Claims, 7 Drawing Sheets

(56) References Cited

OTHER PUBLICATIONS

Gondree et al., "Geolocation of Data in the Cloud", ACM, Feb. 18-20, 2013, 12 pages.
Jaiswal et al., "IGOD: Identification of Geolocation of Cloud Datacenters", 40th Annual IEEE Conference on Local Computer Networks, 2015, pp. 665-672.
Krauß et al., "Using Trusted Platform Modules for Location Assurance in Cloud Networking", Springer, 2013, 2 pages.

\* cited by examiner

LOCATING SYSTEM RESOURCES

BACKGROUND

A computing system can utilize different types of resources to provide services to end users and/or customers. For example, a computing system can utilize hardware resources, cloud resources, and/or container resources to provide services such as cloud storage and/or web applications. In some examples, the cloud application and/or web applications can store data associated with a particular user. In some examples, the data storage can be subject to legal restrictions.

DETAILED DESCRIPTION

Figure 1:
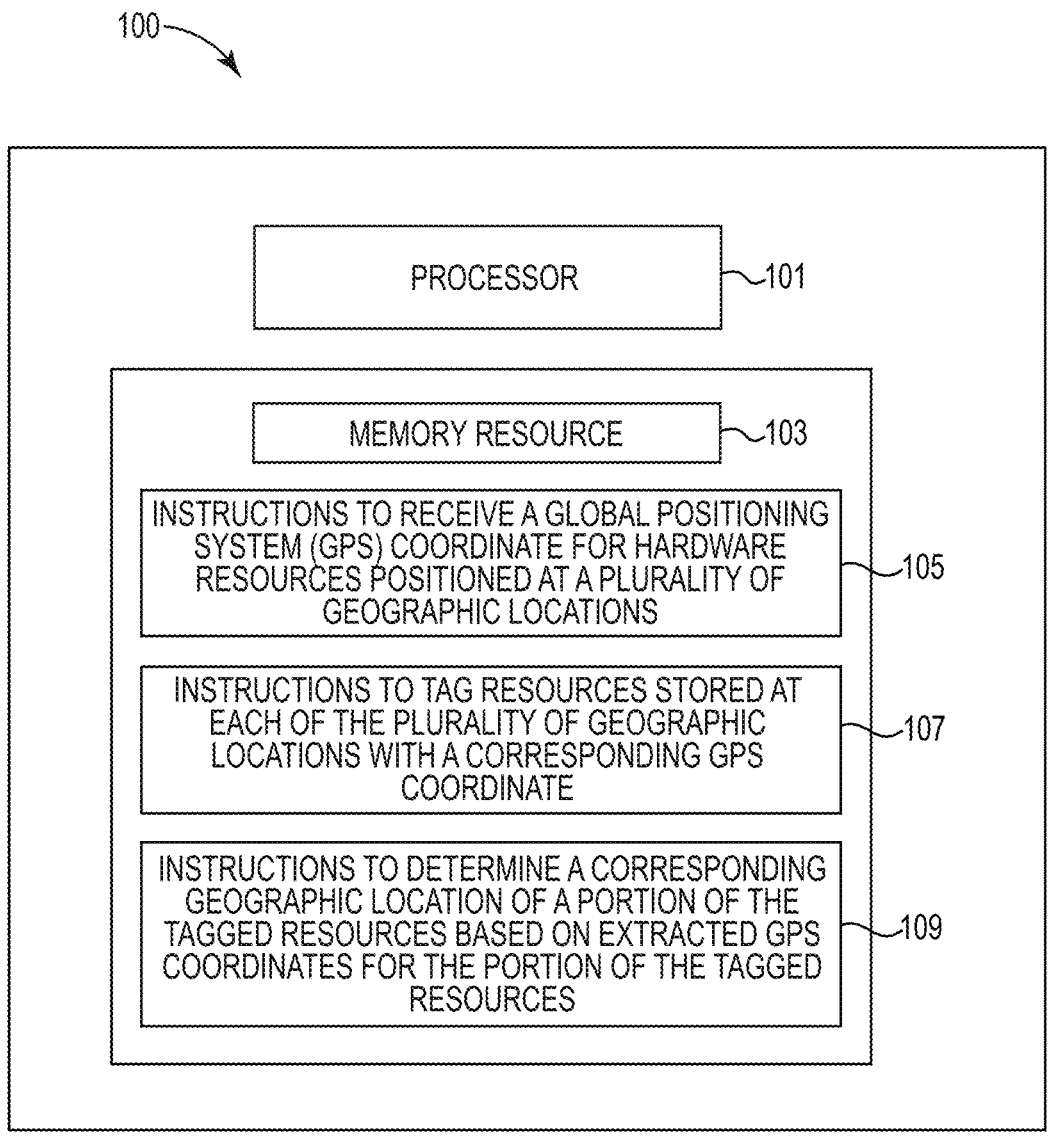
FIG. 1 illustrates an example system for locating system resources consistent with the disclosure.

Computing systems can be utilized to directly provide services utilizing hardware resources of the computing system, provide services utilizing cloud resources, and/or provide services utilizing container resources. In some examples, the computing system can be utilized to generate a cloud computing environment. A cloud computing environment can include public clouds, private clouds, and/or a hybrid cloud. As used herein, a public cloud can, for example, include computing services offered by third-party providers over a public network such as the Internet. In contrast, private clouds can, for example, include information technology (IT) services that are provisioned over a private network or private IT infrastructure for dedicated use of a single organization. In some examples, a hybrid cloud can include portions that are public and portions that are private.

In some examples, users can utilize a computing system to produce confidential data such as personal data or account data. For example, users in the financial sector, government sector, and/or healthcare industry can use public clouds to store their confidential data. In some examples, users can store private data generated utilizing resources of a computing system. For example, users can utilize a web application that stores account information for a user. In other examples, users can utilize cloud resources and/or container resources to store data and/or perform particular functions. In some examples, the data can be stored in a first geographic location of the computing system. In these examples, the data can be moved from the first geographic location to a second geographic location without informing the user associated with the data. The computing system can move the data from the first geographic location to the second geographic location while allowing the user to continue to utilize the resources without interruption or with little interruption of service. Thus, a user may want to request the geographic location of the stored data.

In some examples, governments can have regulations for data storage of particular data associated with citizens of that government. For example, the General Data Protection Regulation (GDPR) of the European Union (EU) has enacted a set of laws that control how personal data can be collected on individuals living in, or who are citizens of, any of the EU member states. In some examples, enterprises can be unaware that GDPR applies to all organizations holding and processing EU resident's personal data, regardless of the geographic location. Thus, enterprises outside the EU can be unaware that the EU GDPR regulation applies to them as well.

In some examples, enterprises can be asked to be audit ready at a given time (e.g., a time that is unknown to the user, etc.). This can involve generating reports on demand indicating the current level of compliance, compliance failures, and/or trend data for compliance gaps. In some examples, compliance regulations can vary between geographic locations. Thus, how an enterprise would prepare for an audit can vary. Some approaches can include locating public cloud services and deploying resources specific to the cloud. However, those approaches do not include knowing locations of the hardware systems generating the virtual resources and the locations of the virtual resources.

As such the disclosure is directed towards a system to locate the physical hardware generating recourses of a computing system by tagging the data with global positioning system (GPS) coordinates. As used herein, a geographic location can, for example, include a specific GPS coordinate, a general geographic area, and/or a particular country, state, or province governed by a particular entity. As used herein, a GPS can for example, include a satellite-based navigation system used to determine the geographic location of an object.

As used herein, a data center can, for example, include a space to house computer systems and associated resources. As used herein, a resource can, for example, include a hardware resource (e.g., hard drive, memory, CPU, etc.) and/or a virtual resource (e.g., VMs, volumes, etc.) that are presented as a utility to a user. The system can receive GPS coordinates for a plurality of geographic locations for resources of a cloud environment, and tag resources stored at each of the plurality of geographic locations. As used herein, a GPS coordinate can, for example, include a unique identifier of a geographic location on the earth. In some examples, the GPS coordinate can be expressed in alphanumeric characters. As used herein, a tag can, for example, include assigning data (e.g., metadata, etc.) to hardware resources, data stored on hardware resources, container resources, cloud resources, and/or virtual resources for identification purposes. In some examples, a tag can be a label including a parameter and/or a value that can make it easier to manage, search for, and filter hardware resources. For example, a hardware resource (e.g., GPS coordinate) can be tagged to identify the geographical location of the hardware. In some examples, a tag can be used to locate hardware resources (e.g., servers, computing devices, etc.) associated with a web application, cloud resource, and/or container resource.

In some examples, a geographical location of a resource (e.g., hardware resource, cloud resource, container resource, etc.) can be located based on the tagged hardware resources utilized to generate the resource. For example, a geographical location of a virtual memory can be located using the tagged GPS coordinate extracted from the physical location of the physical machine utilized to generate the virtual memory. In this example, when a physical machine is being virtualized, a hypervisor can store information related to the hardware resources including tagged hardware resources in the golden image of the hypervisor. As used herein, a hypervisor can, for example, include computer instructions, firmware, and/or hardware that creates and runs the VMs. In some examples, the virtual resources that are generated by the hypervisor can be located using the tagged virtual GPS (vGPS) coordinate that emulates the GPS coordinate stored in the golden image of the hypervisor. As used herein, golden image can, for example, include a version of a cloned disk that can be used as a template for various kinds of virtual network hardware (e.g., template for VM, virtual desktop, server hard disk drive etc.).

The system can determine a geographic location of a portion of the tagged hardware and resources based on the GPS coordinates for that portion of the tagged resources. For example, the system can determine a data center is located in the US East based on an extracted GPS coordinate for the tagged hardware resources of the data center. Similarly, the system can determine a first portion of the resources are located in the US East and a second portion of the resources are located in the US West based on the extracted GPS coordinates of the corresponding resources. In some examples, the resources can be virtual resources. In these examples, the virtual resources can be tagged by the hypervisor with a virtual GPS (vGPS) to identify the geographic location of the hypervisor and/or hardware resources generating the virtual resources. Determining the geographic location of a portion of the tagged resources can help the system to decide the geographic location the tagged portions are located in. In some examples, determining the geographic location of a portion of the tagged resources can help users to conform to regulations of that geographic location and/or notify users of the geographic location of the resources that can be storing data associated with the user.

The present disclosure may provide examples of resources including hardware resources, virtual resources, and/or container resources being tagged with a GPS or vGPS to designate a geographic location of hardware resources being utilized to generate the resources. Additionally, the examples may be practiced using applications such as web applications provided by the hardware servers located in a data center of a geographic location. As used herein, web application can, for example, include an application program that is stored on a remote server and delivered over the Internet through a browser interface.

FIG. 1 illustrates an example system 100 for locating system resources consistent with the disclosure. System 100 can include a processor 101 and a memory resource 103. Memory resource 103 can store machine-readable instructions to cause the processor 101 to perform a number of operations related to locating system resources. The memory resource 103 can be a machine-readable storage medium that can store instructions 105, 107, and 109 executed via the processor 101, to receive a GPS coordinate for hardware resources located at a plurality of geographic locations, tag resources, and determine geographic locations of the tagged resources based on corresponding GPS coordinates of the tagged resources.

Although the following descriptions refer to a single processor and a single machine-readable storage medium, the descriptions may also apply to a system with multiple processors and multiple machine-readable storage mediums. In such examples, the system 100 may be distributed across multiple machine-readable storage mediums distributed across multiple processors. Put another way, the instructions executed by the system 100 may be stored across multiple machine-readable storage mediums and executed across multiple processors, such as in a distributed or virtual computing environment.

Processor 101 may be a central processing unit (CPU), microprocessor, and/or other hardware device suitable for retrieval and execution of instructions stored in memory resource 103. With respect to the executable instruction representations or boxes described and shown herein, it should be understood that part or all of the executable instructions and/or electronic circuits included within one box can be included in a different box shown in the figures or in a different box not shown.

The memory resource 103 may be electronic, magnetic, optical, or other physical storage device that stores executable instructions. Thus, machine readable storage medium of memory resource may be, for example, Random Access Memory (RAM), an Electrically-Erasable Programmable Read-Only Memory (EEPROM), a storage drive, an optical disc, and the like. The executable instructions may be installed on the system 100 illustrated in FIG. 1. Machine-readable storage medium of memory resource 103 may be a portable, external or remote storage medium, for example, that allows the system 100 to download the instructions from the portable/external/remote storage medium. In this situation, the executable instructions may be part of an "installation package". As described herein, machine-readable storage medium of memory resource may be encoded with executable instructions to receive GPS coordinate for hardware resources located at a plurality of geographic locations, tag resources, and determine geographic locations of the tagged resources based on corresponding GPS coordinates of the tagged resources.

System 100 can include instructions 105 that when executed by the processor 101 can receive a global positioning system (GPS) coordinate for hardware resources positioned at a plurality of geographic locations. In some examples, receiving the GPS coordinate for hardware resources positioned or located at the plurality of geographic locations can include receiving a geolocation of the hardware resources. The plurality of geographic locations can be located in different countries, different areas of a country, and/or different areas of Earth (e.g., United States (US) East area, US West area, EU East area, etc.). In some examples, a geographic location can include a collection of physical and virtual resources mapped to one or more physical data centers in that geographic location. In some examples, each data center of a geographic location can be designed to be isolated from the other data centers located at other geographic locations in order to work independently. For example, a public cloud service such as the Amazon Web Services (AWS) can be generated by hardware resources located at a plurality of geographic locations, such as US East area and US West area. If an earthquake destroyed the hardware resources of AWS's US West area, the hardware resources of the US West area can still be running since it may not have been affected by the earthquake. In some examples, a geographic location of the hardware resources and resources (e.g., instruction resources such as applications and data, cloud resources such as virtual machines, container resources such as containers, etc.) stored on or provided by the hardware resources can be mapped using a GPS coordinate. In some examples, each data center or hardware resource located at each geographic location can include its own application programming interface (API) endpoints, networks, and compute resources.

In some examples, a geographic location can include a plurality of data centers that include a plurality of hardware resources. In some examples, a data center can store, manage, and disseminate resources. In some examples, a data center can be located at a geographic location that has the ability to provide resources to multiple other geographic locations. For example, a first data center located in a first geographic location can utilize hardware resources to provide services and/or resources to customer devices located in a second geographic location. In some examples, the resources provided by the hardware resources of the first data center located in the first geographic location can transfer the resources to a second data center located in a second geographic location. In some examples, the first data center and the second data center can be governed by different data policies. For example, the first data center can be located in a first country with a first set of laws that govern the policy of data storage and the second data center can be located in a second country with a second set of laws that govern the policy of data storage. However, the transfer of resources from the first data center to the second data center may not be known to the customer that utilizes the resources. That is, the customer may not be notified when the resources are transferred from the first data center to the second data center.

System 100 can include instructions 107 that when executed by the processor 101 can tag resources stored at each of the plurality of geographic locations with a corresponding GPS coordinate. In some examples, a resource can be tagged by assigning data (e.g. metadata) to the resources. In some examples, physical machines can be tagged by tagging hardware resources (e.g. server blade, computing device, server rack, etc.) to determine the location of the physical machine generating resources such as instruction resources, cloud resources, container resources, and/or storage resources, among other types of resources that can be utilized by customers utilizing the hardware resources of the physical machine. In some examples, a geographic location of a web application can be determined by tagging the hardware server associated with the web application and/or tagging the web application with the same tag as the hardware server. In this way, when the geographic location of the hardware server associated with the web application changes to a different geographic location, the tag of the web application can be updated with the same tag as the different geographic location.

In some examples, virtual resources can be tagged by a hypervisor generating the virtual resource (e.g., VM, virtual storage, etc.). For example, a physical machine such as a server can virtualize the physical machine by emulating the physical machine with a hypervisor. In some examples, hardware resources can be virtualized using a hypervisor to allow an end user to utilize an emulated version of the physical machine. In some examples, the hardware resources can be tagged, and the tagged hardware resources can be stored in the golden image of a hypervisor. For example, a tagged vGPS coordinate can be stored in the golden image of the hypervisor. The virtual resources that are generated by the hypervisor can be located using the tagged vGPS coordinate stored in the golden image of the hypervisor. As used herein, a vGPS coordinate can, for example, include a GPS coordinate that is tagged to a virtual resource. In this way, a location of the hardware resources and/or physical resources utilized to generate the virtual resource can be determined.

In some examples, a tagged resource can be generated by hardware located at a particular geographic location. The location of the tagged resource can change when the tagged resource is transferred from a first location to a second location. For example, a tagged application such as web application can be generated by a hardware server at a particular location. The location of the tagged web application can change when the tagged application is transferred from a first server located in a first location to a second server located in a second location. In some examples, virtual resources generated by a physical machine can be located in a plurality of different data centers (e.g., first data center, second data center, third data center) physically located in different geographic locations. In some examples, the plurality of data centers can be located in a plurality of different geographic areas (US East area, US West area, etc.). Based on the extracted GPS coordinates corresponding to the first, second, and third data center, the one or more geographic locations where the resources are being provided can be determined. For example, the first data center can be determined to be in the US East area based on the extracted GPS coordinate of the physical machine that generated the virtual resources of the first data center, and the second and third data center can be in the US West area based on the extracted GPS coordinate of the physical machine that generated the virtual resources of the second and third data center.

In some examples, tagged resources can be generated by data centers located in a plurality of geographic locations. For example, a first data center can be located in a first geographic location (e.g. New York City). A tag such as a GPS coordinate can be assigned to later be extracted to identify the geographical location of the first data center. In some examples, if the resources from the first location are transferred to a second data center in a second geographic location (e.g., Massachusetts) through a network or communication channel, the tag can be updated. The updated tag can be extracted to determine the second data center to be in the second location based on the extracted GPS coordinate of the tagged resource. In some examples, instructions to tag the resources include instructions to assign a label to the physical and virtual resources to identify a geographic location of the resources. In some examples, the tag resources can include migration information. As used herein, migration information can, for example, include information related to resources being transferred from one area and/or data center to another area and/or data center. In some examples, the migration information can include a time that the resource was migrated from a first location to a second location, the storage needed to migrate the resources, data size, and/or the number and nature of dependencies between resources. For example, the tagged resources can have information about storage needed for resources when they are migrating from a first geographic location and/or data centers to a second geographic location and/or data center. In some examples, the migration information includes a timestamp that indicates a time when the resources were stored at previous geographic locations. In some examples, the timestamp can be utilized to determine a quantity of time that the resources were stored at the previous geographic locations.

In some examples, the resources can be regulated by policies that define compliance rules for the resources. For example, regulatory rules in the EU to protect private data about the EU residents can be different from the regulatory rules in Canada, China, and/or India. In this example, data stored by or for the resources that relate to EU residents can be regulated by policies defined by the regulatory rules in the EU. Thus, the GPS coordinates can be utilized to identify compliance issues with the data related to the EU residents and confirm that the physical location of the data centers generating the resources to store the data related to the EU residents are stored based on the policies. In some examples, if a tagged resource violates a regional policy, an alert can be generated. For example, if data related to the EU residents is stored in a data center in China, it can be determined that the data storage does not conform to the EU regulations. In this example, an alert can be generated and sent to a customer or administrator of the data.

In some examples, the alert can be sent to a user associated with the first portion of the resources. For example, the user can be associated with an account that utilizes the first portion of resources. In this example, a user of the account can be sent an alert when the first portion of the resources are violating a compliance policy associated with the account. In some examples, the alert can include sending a message, altering the access rights on cloud resources, terminating a cloud resource, and/or displaying the location of nonconforming resources on a map. As used herein, a map can, for example, include a diagrammatic representation of an area of land and/or sea showing physical features (e.g., areas, data center locations, location of tagged resources, etc.).

The system 100 can include instructions 109 that when executed by the processor 101 can determine a corresponding geographic location of a portion of the tagged resources based on extracted GPS coordinates for the portion of the tagged resources. As described herein, the tagged resources can be physical resources, virtual resources, cloud resources, applications, web applications, among other types of computing resources. In some examples, determining a geographic location can include identifying a geolocation of physical resources utilized to store data and/or generate the resources. In some examples, determining a corresponding geographic location can also include locating tagged resources that correspond to a particular geographic area. As described herein, a portion of the resources can be tagged utilizing a label (e.g. GPS coordinate) attached to the resources. In some examples, the system 100 can include instructions 109 to determine, via the processor 101, the corresponding geographic location of the tagged portions of the resources based on the extracted GPS coordinates for the portion of the tagged resources. For example, a GPS coordinate corresponding to the tagged portion can show that the data center in which the data is stored is located in China.

In some examples, knowing the geographic location of the tagged resources can help determine locations of the data centers associated with the resources. In some examples, the extracted GPS coordinates can be utilized to generate a map of the tagged portions of resources to be displayed to a user. In some examples, the map can display the GPS coordinate for the tagged resources at a particular time. In some examples, the map can display migration data for the resources. For example, the map can display that the tagged resources have migrated from a first geographic location/first data center to a second geographic location/second data center. The migration data can help users to conform to regulations of that geographic location and/or conform to policies associated with the data being stored in that data center.

Figure 2:
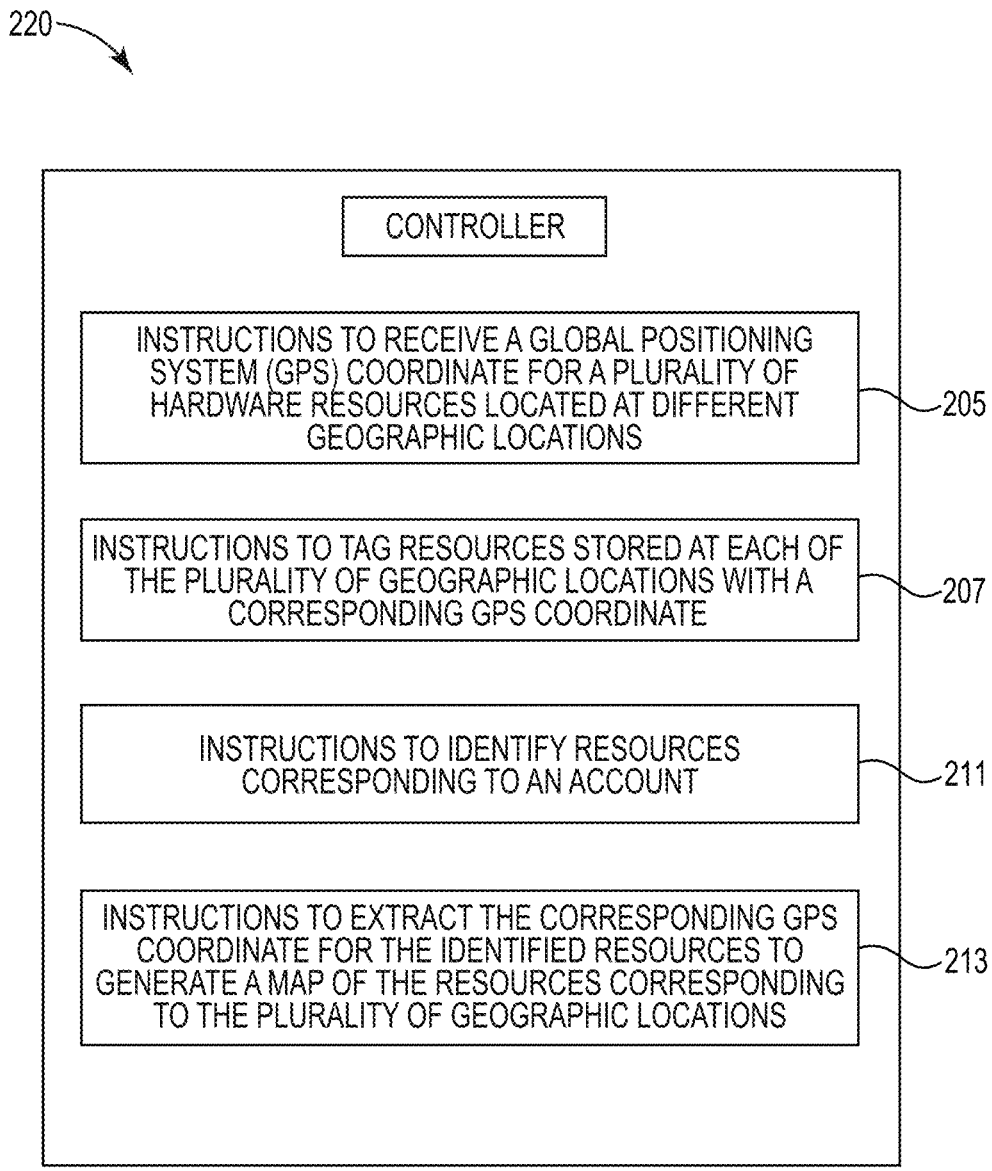
FIG. 2 illustrates an example controller for locating system resources consistent with the disclosure.

FIG. 2 illustrates an example controller 220 for locating system resources consistent with the present disclosure. In some examples, the controller 220 can be a computing device that can execute instructions 205, 207, 211 and 213 to perform particular functions. For example, the controller 220 can include a memory resource, and a processor analogous to processor 101 and memory resource 103 described in relation to FIG. 1, to store instructions 205, 207, 211, and 213 executable by the processor to locate cloud system resources.

Controller 220 can include instructions 205 that are executable by a processor to receive a global positioning system (GPS) coordinate for a plurality of hardware resources located at different geographic locations. In some examples, receiving the GPS coordinate of the plurality of geographic locations can include receiving a geolocation of the geographic areas of a country. The plurality of geographic locations can be located in different geographical areas (e.g., United States (US) East area, US West area, EU East area, etc.). In some examples, a geographic location can include a collection of hardware resources and virtual resources mapped to one or more physical data centers in that geographic location. In some examples, each geographic location of a plurality of geographic locations can be designed to be isolated from the other geographic locations in order to work independently.

In some examples, a geographic location can include a plurality of data centers, hardware resources, and/or computing devices. In some examples, a data center can store, manage, and disseminate resources. In some examples, a data center can be in an isolated geographic location that has the ability to provide resources to multiple other geographic locations. For example, a data center can be physically located at a first geographic location and provide resources to customer computing devices physically located at a second geographic location. Despite the physical location of the first data center being different from the physical location of the customer computing device, the resources of the first data center can be utilized by the customer computing devices located at the second geographic location. Additionally, the first data center can transfer the resources to a second data center that has a different physical location than the first data center. In some examples, the transfer of the resources between the first data center and the second data center can be done through a network such as the Internet.

The controller 220 can include instructions 207 that are executable by a processor to tag resources stored at each of the plurality of geographic locations with a corresponding GPS coordinate. In some examples, a resource can be tagged by assigning data (e.g., metadata) to the resources. In some examples, hardware resources (e.g., physical machines, physical computing devices, etc.) can be tagged to identify the geographic location of the hardware resources. In some examples, data or instructions stored on the hardware resources can be tagged with the same GPS coordinate or geographic location as the hardware resources to identify the location of the hardware resources storing the data or executing the instructions. In some examples, virtual resources can be tagged by a hypervisor generating the virtual resource (e.g., VM, virtual storage, etc.) with the same geographic location or GPS coordinate as the hypervisor to identify the geographic location of the hypervisor generating the virtual resource. For example, a physical machine such as a server can emulate the physical machine by virtualizing the physical machine with virtual resources. In some examples, hardware resources can be virtualized using a hypervisor to allow an end user or customer device to utilize an emulated version of the hardware resources. In some examples, the hardware resources can be tagged, and the tagged resources can be stored in the golden image of a hypervisor. For example, a tagged vGPS coordinate can be stored in the golden image of the hypervisor and utilized to tag virtual resources generated by the hypervisor with a corresponding vGPS coordinate. The virtual resources that are generated by the hypervisor can be located at a later time using the tagged vGPS coordinate stored in the golden image of the hypervisor.

In some examples, a tagged resource can be stored and/or generated by hardware located at a particular location. The location of the tagged resource can change when the tagged resource is transferred from a first location to a second location.

In some examples, the tagged hardware resources can be utilized to generate, store, and/or execute a container resource. As used herein, a container resource can, for example, include instructions that packages up a particular set of instructions and dependencies of the particular set of instructions. In some examples, container resources can be utilized to run one computing environment to another. In some examples, the container resources can be tagged with a GPS coordinate that corresponds to the GPS coordinate of the hardware resources that are currently storing or executing the container resources. In a similar way to the instruction resources and virtual resources, the tag designated to a container can be updated when the container is transferred from a first hardware resource to a second hardware resource. For example, the container resources can be tagged with a first GPS coordinate that corresponds to a first geographic location of a first hardware resource. In this example, the container resources can be transferred to a second hardware resource that is located at a second geographic location through a network. In this example, the container resource can be tagged with a second GPS coordinate that corresponds to the second geographic location of the second hardware resource. In some examples, the container resource can also be tagged with migration data. In the previous example, the migration data can include a time when the container resource was stored at the first hardware resource, a time when the container was transferred to the second hardware resource, and/or a time when the container resource was stored at the second hardware resource. In this way, the migration data can represent the time that a particular resource was stored or transferred by different hardware resources at different geographic locations.

Controller 220 can include instruction 211 executable by a processor to identify resources corresponding to an account. An account can include a user account, which can allow a user to connect to a network, computing system, and/or computing device. For example, a user can have a private cloud account to access their private cloud resources such as an AWS account. In some examples, the user can utilize the cloud resources of their account to store data related to the user and/or user account including public data, private data, financial data, and other types of information. The controller 220 can include instructions to identify the resources corresponding to the specific account. In some examples, identifying the resources corresponding to an account can be utilized to identify the tagged resources associated with the account. In this way, only resources associated with the account are utilized for tag extraction and location identification.

Controller 220 can include instruction 213 that are executable by a processor to extract the corresponding GPS coordinate for the identified resources to generate a map of the resources corresponding to the plurality of geographic locations. In some examples, determining a corresponding geographic location can include locating tagged resources that correspond to a particular geographic location. As described herein, the resources can be tagged utilizing a label (e.g. GPS coordinate) attached to the resources. For example, a GPS coordinate corresponding to the tagged resource can show that the data center in which the tagged resource is stored is located in China. In some examples, determining the geographic location of the tagged resources can help users to conform to regulations of that geographic location and/or conform to policies associated with the data being stored in that geographic location. In some examples, knowing the geographic locations of the tagged resources can help determine policies or regulations associated with data storage. For example, identifying that tagged resources are physically stored or generated at a data center located at a first geographic location can be utilized to identify policies associated with the first geographic location and whether storing or generating the data at the first location is compliant with the policies associated with the first location and/or compliant with the policies associated with the tagged resources.

In some examples, the extracted GPS coordinates data of the tagged resources can be utilized to generate a map of the tagged portions of resources to be displayed to a user. In some examples, the map can display the GPS coordinate data for the tagged resources at a particular time. In some examples, the map can display transition data or migration data for the resources. For examples, the map can display that the tagged resources have migrated from a first data center located at a first geographic location to a second data center located at a second geographic location. The migration data can, once again, help users to conform to regulations of that geographic location and/or conform to policies associated with the data being stored in that geographic location.

In some examples, the map can be generated utilizing resources associated with a particular account and/or a particular user. In this way, a user can more easily identify their own resources and policies associated with their particular resources. In this way, the particular user can utilize the generated map to help prove compliance with a governing body. For example, the generated map can illustrate that the resources associated with their account has not been stored in geographic locations that may be restricted due to the type of resources or data stored at the geographic location.

Figure 3:
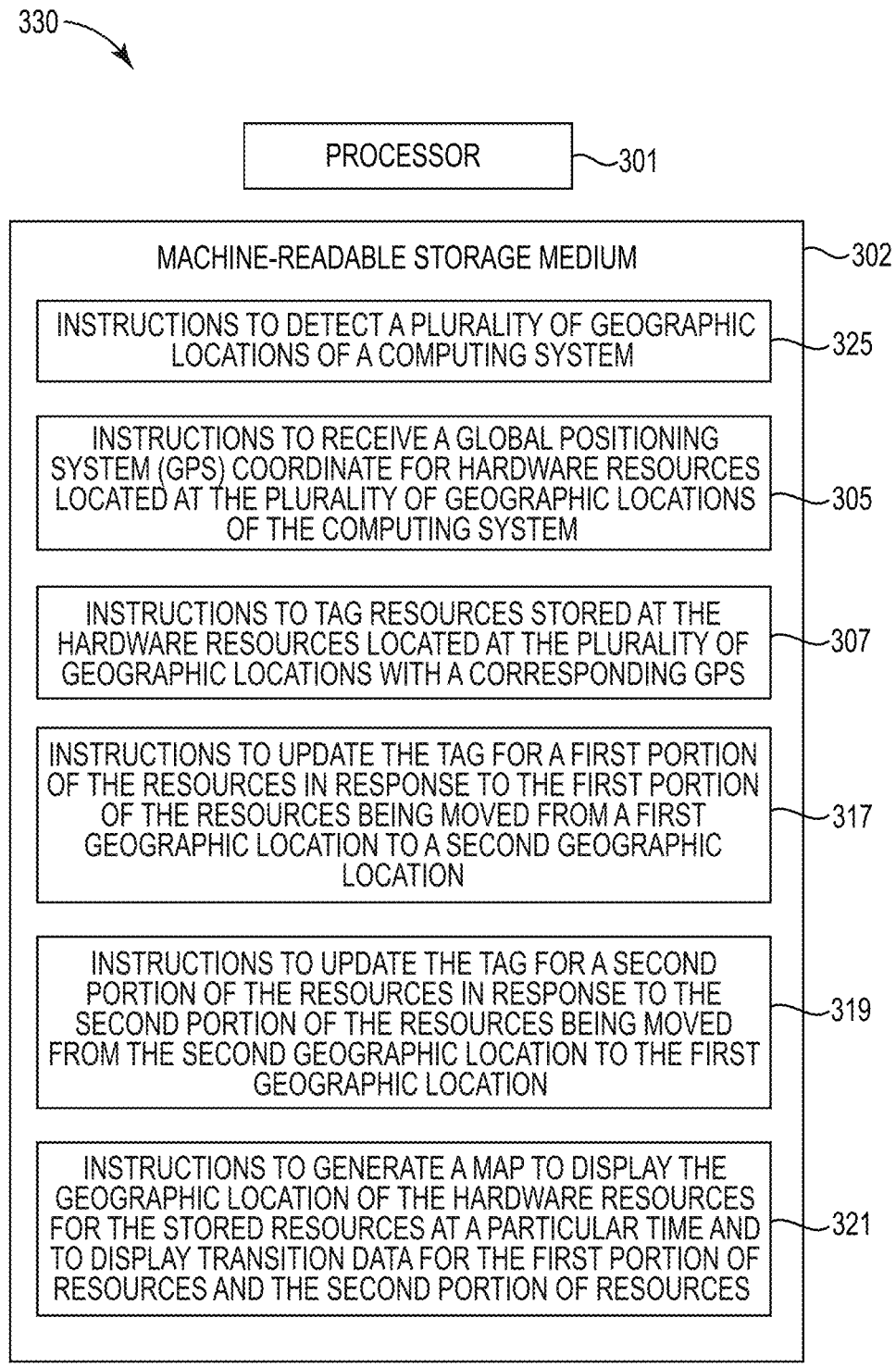
FIG. 3 illustrates a block diagram of an example system for locating system resources consistent with the disclosure.

FIG. 3 illustrates a block diagram of an example system 330 for locating system resources consistent with the disclosure. System 330 can include a processor 301 and a memory resource with store machine-readable storage medium 302 to cause the processor 301 to perform a number of operations related to locating system resources (e.g., hardware resources, virtual resources, container resources, etc.). Processor 301 may be a central processing unit (CPU), microprocessor, and/or other hardware device suitable for retrieval and execution of instructions stored in machine-readable storage medium 302. As an alternative or in addition to retrieving and executing instructions, processor 301 may include an electronic circuit comprising a number of electronic components for performing the operations of the instructions in machine-readable storage medium 302. With respect to the executable instruction representations or boxes described and shown herein, it should be understood that part or all of the executable instructions and/or electronic circuits included within one box may be included in a different box shown in the figures or in a different box not shown.

Machine-readable storage medium 302 may be an electronic, magnetic, optical, or other physical storage device that stores executable instructions. Thus, machine-readable storage medium 302 may be, for example, Random Access Memory (RAM), an Electrically-Erasable Programmable Read-Only Memory (EEPROM), a storage drive, an optical disc, and the like. The executable instructions may be "installed" on the system 330 illustrated in FIG. 3. Machine-readable storage medium 302 may be a portable, external, or remote storage medium, for example, that allows the system 330 to download the instructions from the portable/external/remote storage medium. In this situation, the executable instructions may be part of an "installation package". As described herein, machine-readable storage medium 302 may be encoded with executable instructions for deploying a workload.

At 325, system 330, when executed by a processor such as processor 301, can detect a plurality of geographic locations of a computing system. The plurality of geographic locations can be different geographical locations (e.g., United States (US) East area, US West areas, EU East area, etc.) of different resources associated with the computing system. In some examples, a geographic location can include a geographical location that includes a collection of physical and virtual resources mapped to one or more hardware resources (e.g., physical data centers, etc.) in that geographic location. In some examples, each geographic location of a plurality of geographic locations can be designed to be isolated from the other geographic locations in order to work independently.

At 305, system 330, when executed by a processor such as processor 301, can receive a global positioning system (GPS) coordinate for hardware resources located at the plurality of geographic locations of the computing system. In some examples, physical and virtual resources stored at each of the plurality of geographic locations can be tagged with a corresponding GPS coordinate. In some examples, the GPS coordinate can be retrieved from a tagged web application deployed by a hardware resource located at a particular geographic location. For example, a GPS coordinate can be retrieved from a tagged web application deployed in a computer located at a particular geographic location. In some examples, the GPS coordinate can be retrieved from a web application deployed on a virtual resource (e.g., virtual machine, etc.). In some examples, the GPS coordinate can be retrieved from the tagged web application deployed with a container resource.

At 307, system 330, when executed by a processor such as processor 301, can tag resources stored at the hardware resources located at the plurality of geographic locations with a corresponding GPS coordinate. In some examples, a resource can be tagged by assigning data (e.g. metadata) to the resources. In some examples, hardware resources (e.g. server blade, computing device, server rack, etc.) can be tagged to identify the geographic location of the hardware resource. Similarly, system 330, when executed by a processor such as processor 301, can tag an application such as a web application associated with a hardware resource at each of the plurality of geographic locations with a corresponding GPS coordinate. In some examples, virtual resources can be tagged by a hypervisor generating the virtual resource (e.g., VM virtual storage, etc.). For example, a physical machine such as a server can emulate the physical machine by virtualizing the physical machine. In some examples, hardware resources can be virtualized using a hypervisor to allow an end user to utilize an emulated version of the physical machine. In some examples, the tagged resources can include information to identify the migration data of the resources. In some examples tagged resources can include date and time the resources are identified in the geographic location. For example, a tagged resource can be identified in a first geographic location at a first date and during a first time period. The tagged resource can then be identified in a second geographic location at a second date and a second time period. The identification in different geographic locations at a different time and date can be used to map migration information for the resources.

At 317, system 330, when executed by a processor such as processor 301, can update the tag for a first portion of the resources in response to the first portion of the resources being moved from a first geographic location to a second geographic location. In some examples, system 330 can determine a geographic location of a portion of the tagged hardware and virtual resources based on the tagged GPS coordinates for that portion of the resources. For example, the system 330 can determine a data center is located in a first geographic location (e.g., US East area) based on an extracted GPS coordinate for the tagged resources of the data center. The system 330 can determine a first portion of the resources are located in the first geographic location and a second portion of the resources are located in a second geographic location (e.g., US West area) based on the extracted GPS coordinates of the corresponding resources. If the first portion of the resources is moved from the first geographic location to the second geographic location the system 330 can update the tag for that portion of the resources. The updated tag can be displayed on a map as described herein. As described herein, migration data can be determined based on the updated tag information and the migration data can be tagged or linked to the resources.

At 319, system 330, when executed by a processor such as processor 301, can update the tag for a second portion of the resources in response to the second portion of the resources being moved from the second geographic location to the first geographic location. In some examples, the system 330 can determine a data center is located in a second geographic location (e.g., US West area) based on an extracted GPS coordinate for the tagged resources of the data center. The system 330 can determine a second portion of the resources are located in the second geographic location and the first portion of the resources are located in the first geographic location (e.g., US East area) based on the extracted GPS coordinates of the corresponding resources. If the second portion of the resources is moved from the second geographic location to the first geographic location, the system 330 can update the tag for that portion of the resources.

At 321, system 330, when executed by a processor such as processor 301, can generate a map to display the geographic location of the hardware resources for the stored resources at a particular time and to display transition data for the first portion of resources and the second portion of resources. In some examples, the GPS coordinates for corresponding resources can be displayed on a map. For example, based on the history of the tagged resources, a map can be generated to display the GPS coordinate corresponding to each of the portions of the resources.

Figure 4:
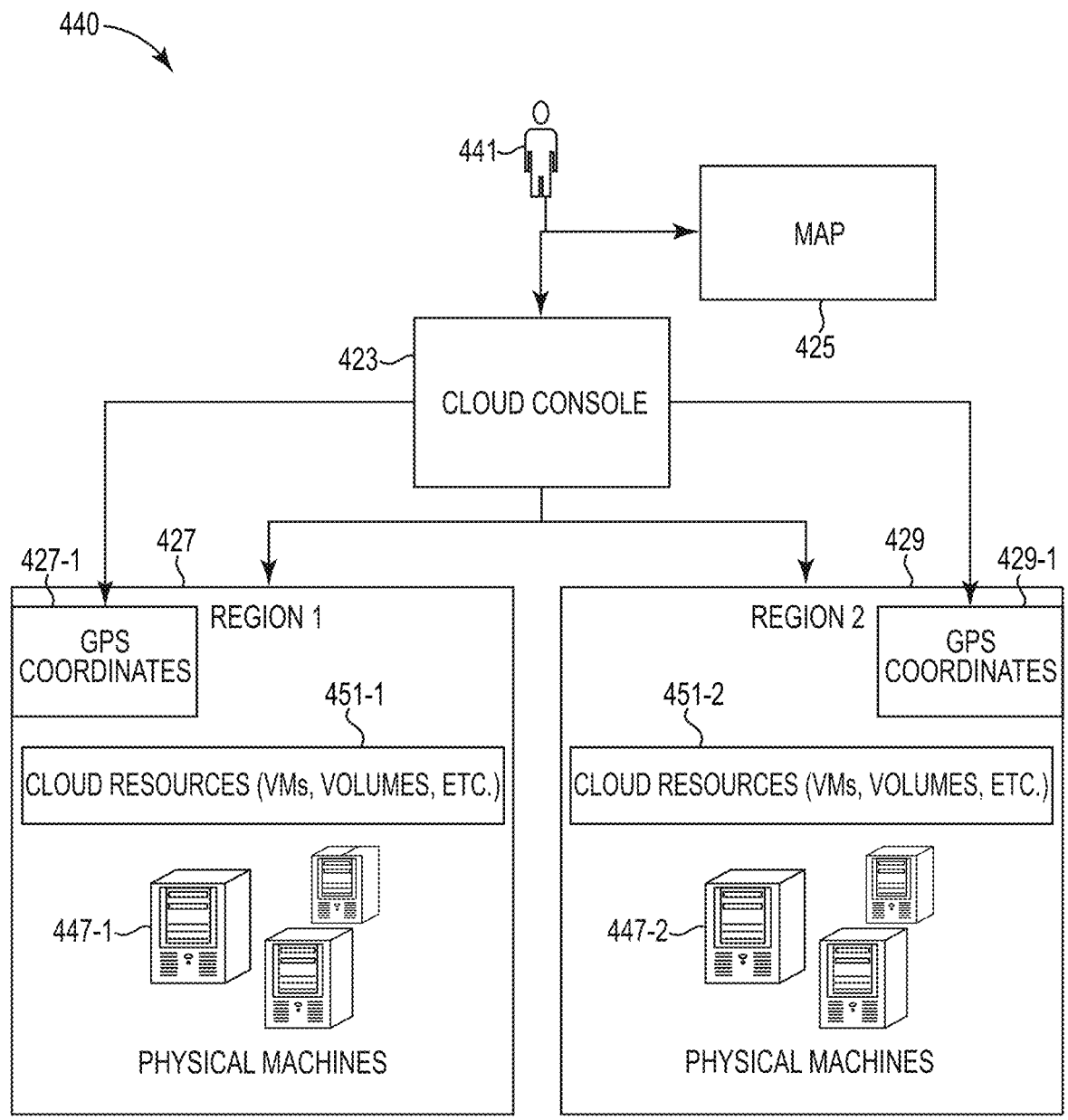
FIG. 4 illustrates a diagram of an example system for locating system resources consistent with the disclosure.

FIG. 4 illustrates a diagram of an example system 440 for locating system resources consistent with the disclosure. The system 440 as illustrated in FIG. 4 can be a method that can be executed by a computing device, controller, and/or other type of device associated with a cloud environment. For example, the system 440 can be stored as instructions in a non-transitory machine readable medium and executed by a processor to perform the elements of the system 440.

In some examples, the system 440 illustrates locating cloud system resources which can start when a user 441 logs into a cloud console 423. As used herein, cloud console 423 can, for example, include an interface to manage and get insights into things that power a cloud application such as web applications, data analysis VMs, data store, databases, networking, and developer services. In some examples a controller and/or an administrator in an area can set up the GPS coordinates for a plurality of areas. In some examples, the user 441 can create an account and store information about the hardware resources and virtual resources associated with the user in the cloud console 423 (e.g., Open Stack Horizon). In some examples the user 441 can create cloud resources 451-1 (e.g., VMs, volumes etc.). In some examples the user 441 can create cloud resources 451-2 (e.g., VMs, volumes etc.) corresponding to a second geographic location 429 using the cloud console 423. In some examples, the user 441 can extract a first GPS coordinate 427-1 corresponding to a first geographic location 427 and a second GPS coordinate 429-2 corresponding to a second geographic location 429.

In some examples, the user 441 can send a request, using the cloud console 423, to extract the GPS coordinate 427-1 for the first geographic location 427. In some examples the first geographic location 427 can include a collection of resources mapped to hardware resources (e.g., physical data centers, etc.) in the first geographic location 427. In some examples, the first geographic location 427 can include hardware resources, container resources, and/or virtual resources 451-1. In some examples, the geographical location of virtual resources 451-1 in the first geographic location 427 can be located using the tagged GPS coordinate 427-1 extracted from the physical location of the physical machine 447-1 utilized to generate the virtual resources 451-1.

In some examples the second geographic location 429 can include a collection of resources mapped to hardware resources (e.g., physical data centers, etc.) in the second geographic location 429. In some examples, the geographical location of virtual resources 451-2 can be located using the tagged GPS coordinate 429-2 extracted from the physical location of the physical machine 447-2 utilized to generate the virtual resources.

The system 440 can determine a geographic location of a portion of the tagged hardware and virtual resources based on the GPS coordinates for that portion of the tagged resources. For example, the system 440 can determine a data center is located in the first geographic location 427 based on the extracted GPS coordinate 427-1 for the tagged hardware resources of the data center. Similarly, the system can determine a first portion of the virtual resources 451-1 are located in the first geographic location 427 and a second portion of the virtual resources 451-2 are located in the second geographic location 429 based on the extracted vGPS coordinates of the corresponding virtual resources. Determining the geographic location of a portion of the tagged resources can help the system to decide the area the tagged portions are located in. In some examples, determining the geographic location of a portion of the tagged resources can help customers to conform to regulations of data stored or utilized in that geographic location.

System 400 can generate a map 425 to display the GPS coordinates for the first geographic location 427 and the second geographic location 429. In some examples, the user 441 can request to display a map at a particular time. In some examples, the user 441 can request to generate a map to display the GPS coordinate for the corresponding resources. In some examples the user 441 can request to display migration data for a portion of the tagged resources. The map displaying the geographical location can help identify the compliance regulations applicable for that geographic location. Thus, a user can better prepare for audits and better comply with regulations of a specific geographic location.

Figure 5:
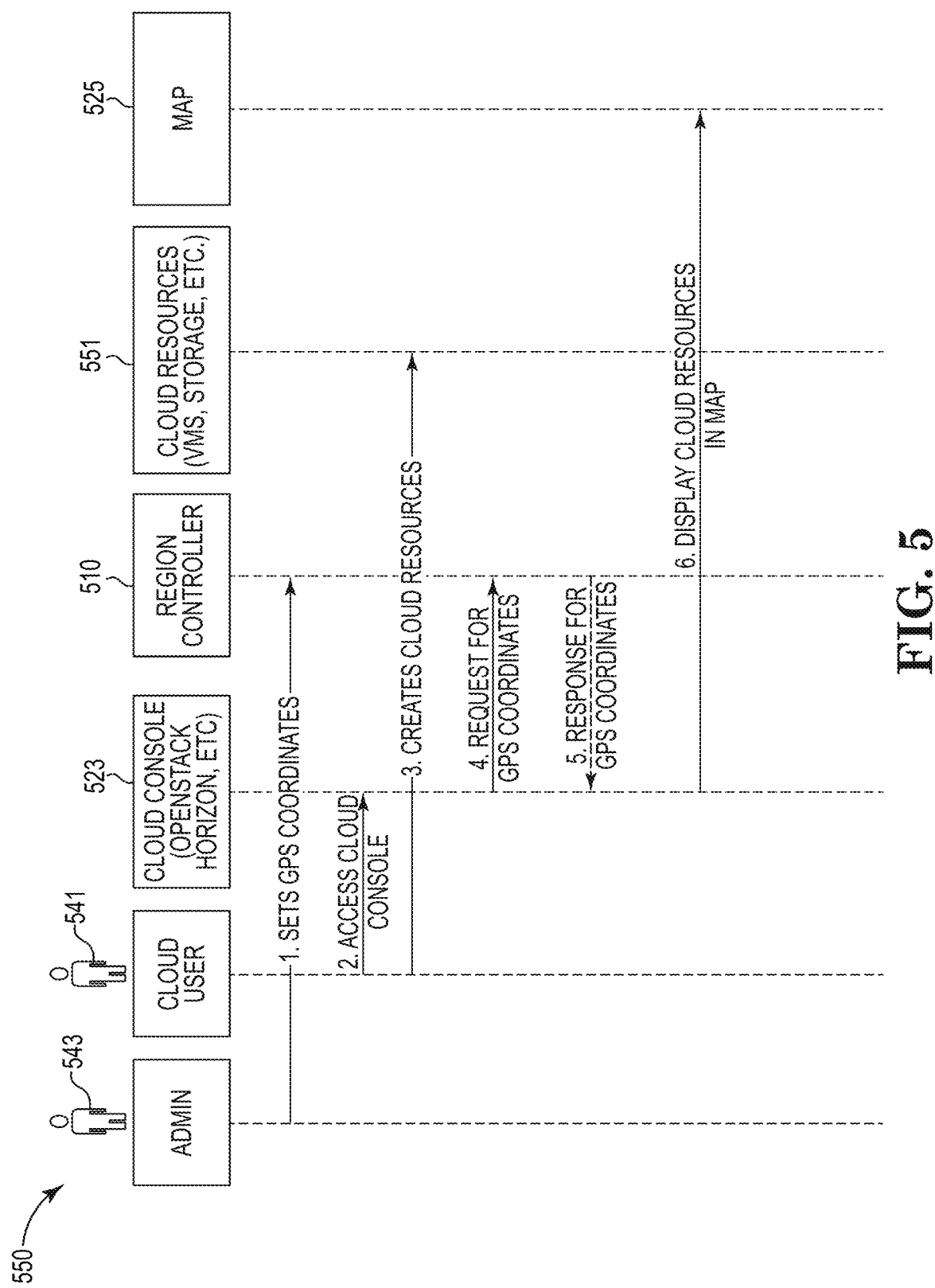
FIG. 5 illustrates a flow diagram for locating system resources consistent with the disclosure.

FIG. 5 illustrates a flow diagram for locating system resources consistent with the disclosure. The flow diagram 550 as illustrated in FIG. 5 can be a method and/or a process that can be executed by a computing device, controller, and/or other type of device associated with a cloud environment Flow diagram 550 illustrates locating cloud system resources which can start when a user 541 logs into a cloud console 523. In some examples, a controller and/or an administrator 543 can set up the GPS coordinates for a plurality of geographic locations. In some examples, the administrator 543 can send data regarding the extracted GPS coordinates to a regional controller 510. In some examples, the controller 510 can respond to the request of the user 541. In some examples, the customer 541 can create an account, store information, and/or receive information about the hardware resources and virtual resources 551 associated with the user 541 in the cloud console 523. In some examples, physical machine can virtualize the hardware resources using a hypervisor to allow user 541 to utilize an emulated version of the physical machine. In some examples, virtual resources 551 can be tagged by a hypervisor generating the virtual resource 551. For example, a physical machine such as a server can virtualize the hardware resources by emulating the physical machine. In some examples, the hardware resources can be tagged, and the tagged resources can be stored in the golden image of a hypervisor. For example, a tagged GPS coordinate can be stored in the golden image of the hypervisor. Similarly, virtual resources 551 that are generated by the hypervisor can be stored in the golden image of the hypervisor. The tagged virtual resources 551 can be located using the tagged vGPS coordinate stored in the golden image of the hypervisor. In some examples, the cloud user 541 can extract the GPS coordinate for the tagged resources for a first geographic location, similar to the first geographic location 427 and the second geographic location 429 as described in relation to FIG. 4.

In some examples, the user 541 can request to display the locations of the resources located in a geographic location. In some examples, the user 541 can request to display a map 525 of tagged resources 551. In some examples, the user 541 can request to display a map 525 at a particular time. In some examples the user 541 can request to display transition data for a portion of the resources. In some examples, compliance regulations can vary between geographic locations. The map 525 displaying the geographical location can help users to identify the compliance regulations applicable for that geographic location. Thus, a user can better prepare for audits and better comply with regulations of a specific geographic location.

Figure 6:
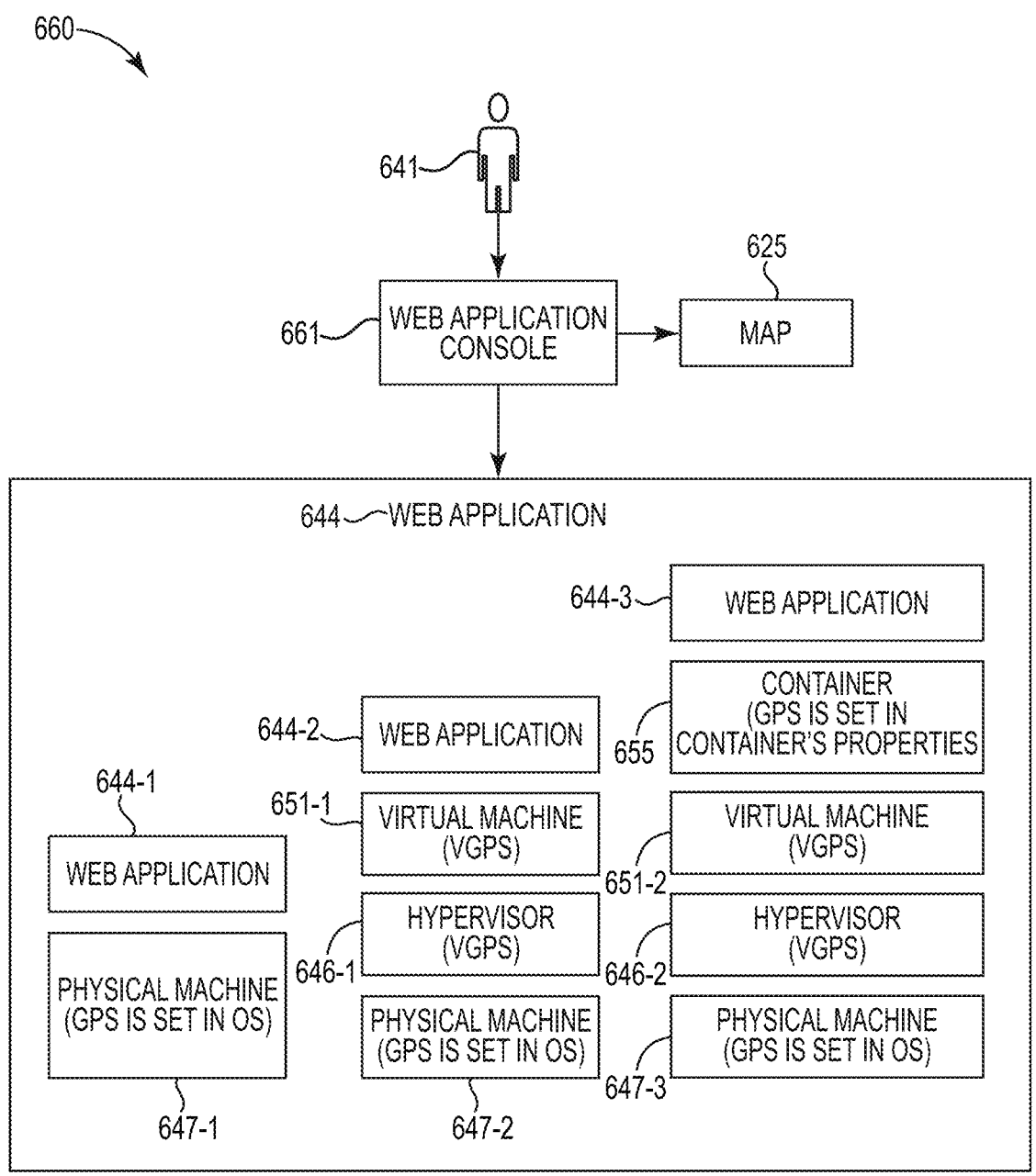
FIG. 6 illustrates a diagram of an example system for locating system resources consistent with the disclosure

FIG. 6 illustrates a diagram of an example system 660 for locating system resources consistent with the disclosure. In some examples, system 660 can locate resources using the GPS coordinates based on a deployment method of a web application 644. In some examples, a web application can be deployed on a physical machine 647-1. In some examples, a web application can be deployed on a VM 651-1. In some examples, a web application can be deployed on a container 655

System 660 illustrates locating resources which can start when a user 641 logs into a web application console 661. As used herein, web application console can, for example, include a web-based application to execute commands (e.g., shell commands) on a server directly from a browser. In some examples, the system 660 can determine the web application is deployed on a physical machine 647-1. In some examples, a hardware resource (e.g., GPS coordinate) of the physical machine 647-1 can be tagged to identify the geographical location of the physical machine 647-1. In some examples, a hardware server storing an application, such as web application 644-1 can be tagged to locate the hardware server located in a data center. In some examples, when the web application 644-1 is deployed on physical machine 647-1, GPS coordinates, can be specified in the golden image of physical machine 647-1 OS. In some examples, the golden image can be provisioned on the hardware servers of the web application 644-1. Once the golden image is provisioned, the GPS coordinates can be saved in/etc/environment file of the OS. In some examples, the web application 644-1 can get the GPS coordinates from/etc/environment. In some examples, physical location of the physical machine 647-1 can be displayed the map 625.

In some examples, the system 660 can determine the web application 644-2 is deployed on a VM 651-1. In some examples, a geographical location of the VM 651-1 can be located based on the tagged hardware resources of the physical machine 647-2. For example, a geographical location of a virtual resource (e.g., vGPS) can be located using the tagged GPS coordinate extracted from the physical location of the physical machine 647-2 utilized to generate the VM 651-1. In some examples, when a VM 651-1 is created, hypervisor 646-1 can read GPS coordinates from the file (e.g., /etc/environments) of hypervisor 646-1 and can assign the GPS coordinates value to a vGPS. In some example, OS of the VM 651-1 can have access to GPS coordinates through the vGPS. In some examples, the web application 644-2 deployed on OS of the VM 651-1 can fetch the vGPS value. In some examples, the GPS coordinate of the physical machine 647-2 and vGPS coordinate of VM 651-1 can be displayed on the map 625.

In some examples, the system 660 can determine the web application 644-3 is deployed on a container 655. As used herein, a container can, for example, include a software that creates abstraction at an OS level that allows individual, and distinct functionality of an application to run independently. In some examples, the container 655 can be on a physical machine 647-3. In some examples, the container 655 can be on a VM 651-2. In some examples, while creating the container 655 the GPS value can be stored in the container property.

In some examples, while creating the container 655 the GPS value can be stored in the container property of the physical machine 647-3. In some examples, the GPS coordinates can be saved in an OS file (e.g., /etc/environment) of the physical machine 647-3. In some examples when the container 655 is being created, the GPS coordinates can be read from the OS file (e.g., /etc/environment) and set in the container properties. In some examples, the web application 644-3 deployed on the container 655 can read the GPS coordinates from the container properties and display the location of the GPS coordinate on the map 625.

In some examples, the container 655 can be on a VM. In some examples, the VM can be the VM 651-2. In some examples, when a VM 651-2 is created hypervisor 646-2 can read GPS coordinates from the file (e.g., /etc/environments) of hypervisor 646-2 and can assign the GPS coordinates value to a vGPS. In some example, OS of the VM 651-2 can have access to GPS coordinates through the vGPS. In some examples, the web application 644-3 deployed on OS of the VM 651-2 can fetch the vGPS value. In some examples while creating a new container in VM 651-2, GPS coordinates can be determined from the vGPS and set in the container properties. In some examples, the web application 644-3 deployed on a container of the VM 651-2 can read the GPS coordinates from the container property and display the location of the GPS coordinates on the map 625.

Figure 7:
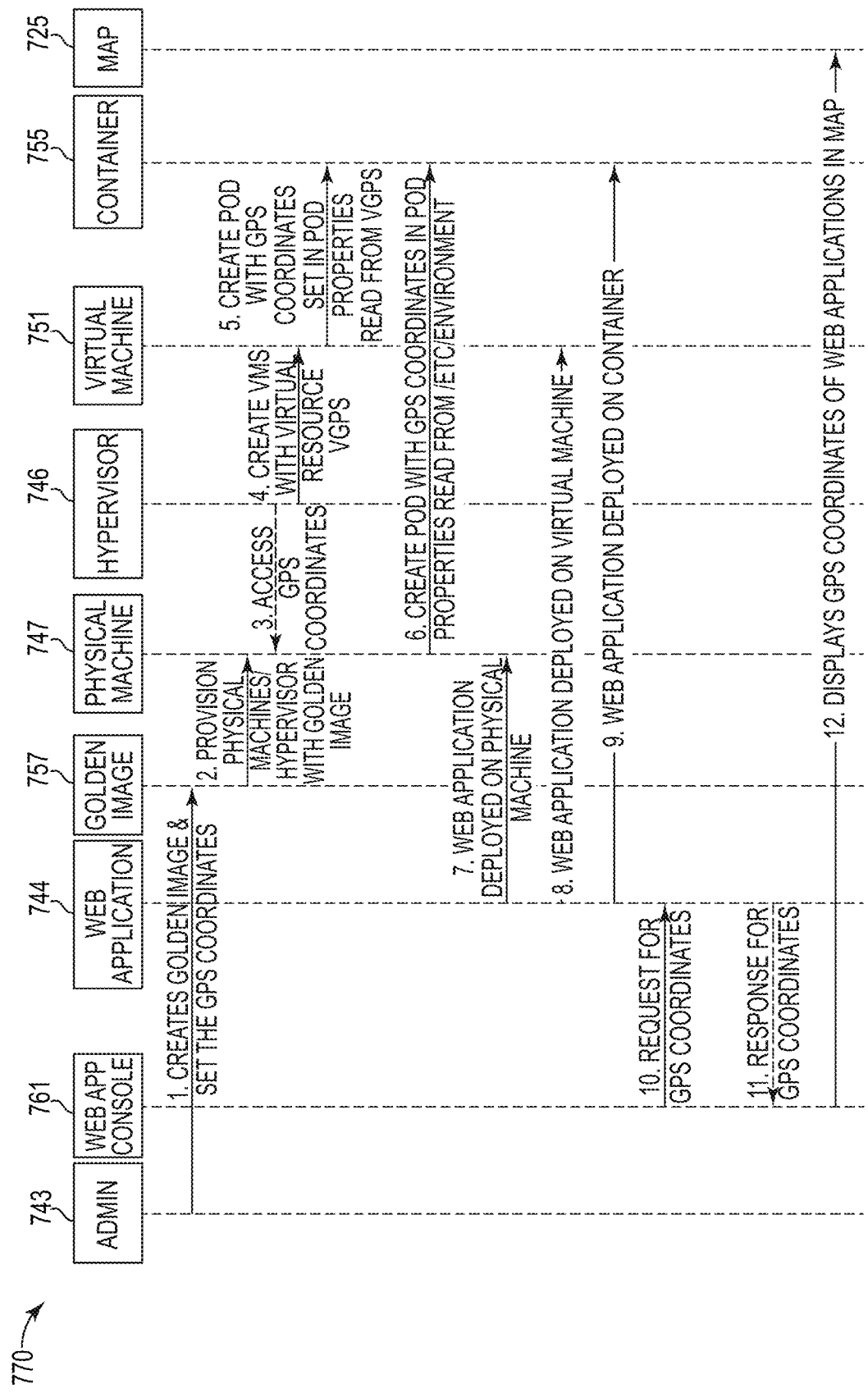
FIG. 7 illustrates a flow diagram for locating system resources consistent with the disclosure.

FIG. 7 illustrates a flow diagram 770 for locating system resources consistent with the disclosure. In some examples, resources and hardware servers associated with the web application can be located using GPS coordinates based on a deployment method of a web application. In some examples, a web application can be deployed on a physical machine. In some examples, a web application can be deployed on a VM. In some examples, a web application can be deployed on a container.

Locating resources and servers associate with web application 744 can start when an administrator 743 logs into a web application console 761. In some examples, a web application 744 can be stored in a hardware server in a data center. In some examples, a user can virtualize a physical machine 747 using a hypervisor 746. In some examples, a hardware resource (e.g., GPS coordinate) can be tagged to identify the geographical location of the physical machine 747. In some examples, the GPS coordinate can be tagged to identify the hardware server of the web application 744. In some examples, a geographical location of a virtual resource can be located based on the tagged hardware resources of the physical machine 747 that has the web application 744 deployed on it. Thus, the virtual resources that are generated by the hypervisor 746 can be located using the tagged virtual GPS (vGPS) coordinate that emulates the GPS coordinate stored in the golden image 757 of the hypervisor 746.

In some examples, the web application 744 can be deployed on a VM 751. In some examples, a GPS coordinate can be virtualized (e.g., GPS coordinate of the physical machine 747) using the hypervisor 746. The vGPS that is generated by the hypervisor 746 can be located using the tagged virtual GPS (vGPS) coordinate that emulates the GPS coordinate stored in the golden image 757 of the hypervisor. In some examples, the location of the GPS coordinates can be displayed on a map 725.

In some examples, GPS coordinates can be stored in the golden image 757 of the hypervisor 746. In some examples physical machine 747 can be provisioned with the golden image 757 and the GPS coordinates can be stored in a file (e.g., etc/environment) of the hypervisor 746. When a VM 751 is created using a hypervisor 746 the functionality of the underlying physical hardware resources can read GPS coordinates from the file (e.g., /etc/environments). In some examples, the GPS coordinates value can be read by a vGPS of the VM 751. In some examples, OS of the VM 751 can have access to the GPS coordinates through the vGPS. In some examples, the web application deployed on the vOS of the VM 751 can fetch the vGPS value and display the location of the GPS coordinate on a map 725.

In some examples, the web application 744 can be deployed on a container 755. In some examples, the container 755 can be on a physical machine. In some examples, the physical machine can be the physical machine 747. In some examples, the container 755 can be on a VM. In some examples, the VM can be a VM 751. In some examples, while creating the container 755 the GPS coordinate can be stored in the container property.

In some examples, while creating the container 755 the GPS coordinate can be stored in the container property of the physical machine 747. In some examples, the GPS coordinates can be saved in an OS file (e.g., /etc/environment) of the physical machine 747. In some examples when the container 755 is being created, the GPS coordinates can be read from the OS file (e.g., /etc/environment) and set in the container properties. In some examples, the web application deployed on the container 755 can read the GPS coordinates from the container properties and display the location of the GPS coordinate on a map.

In some examples, the container 755 can be on a VM. In some examples, the VM can be the VM 751. In some examples, when a VM 751 is created hypervisor 746 can read the GPS coordinates from the file (e.g., /etc/environments) of hypervisor 746, and the GPS coordinate value to a vGPS. In some example, OS of the VM 751 can have access to GPS coordinates through the vGPS. In some examples, the web application deployed on OS of the VM 751 can fetch the vGPS value. In some examples while creating a new container in VM 751, GPS coordinates can be determined from the vGPS and set in the container properties. In some examples, the web application deployed on a container of the VM 651 can extract the GPS coordinates from the container property and display the location of the GPS coordinates on a map.

In the foregoing detailed description of the present disclosure, reference is made to the accompanying drawings that form a part hereof, and in which is shown by way of illustration how examples of the disclosure can be practiced. These examples are described in sufficient detail to enable those of ordinary skill in the art to practice the examples of this disclosure, and it is to be understood that other examples can be utilized and that process, electrical, and/or structural changes can be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure and should not be taken in a limiting sense.

What is claimed is:

1. A system, comprising: a processor; and a non-transitory memory resource storing machine-readable instructions to cause the processor to:
   receive global positioning system (GPS) coordinates for a plurality of resources located at a plurality of geographic locations;
   tag resources located at each of the plurality of geographic locations with corresponding GPS coordinates;
   identify resources corresponding to an account and
   extract GPS coordinates tagged to the identified resources corresponding to the account to generate a geographic map of the identified resources, wherein the plurality of resources located at the plurality of geographic locations include a virtual resource, and
   extract a GPS coordinate for the virtual resource includes using a virtual GPS coordinate stored in a golden image of a hypervisor associated with the virtual resource.

2. The system of claim 1, wherein the instructions to tag the resources includes instructions to assign labels to the resources to identify geographic locations of the resources.

3. The system of claim 1, wherein portions of the tagged resources reside in different geographic locations.

4. The system of claim 1, comprising instructions to tag resources with migration information.

5. The system of claim 1, wherein a tag of the portion of the tagged resources is updated in response to the portion of the resources migrating across the plurality of geographic locations.

6. The system of claim 1, wherein the resources include policies that define compliance rules for the corresponding geographic location of the resources.

7. A method comprising:
   receiving global positioning system (GPS) coordinates for a plurality of resources located at a plurality of geographic locations;
   tagging resources located at each of the plurality of geographic locations with corresponding GPS coordinates;
   identifying resources corresponding to an account; and
   extracting GPS coordinates tagged to the identified resources corresponding to the account to generate a geographic map of the identified resources,
   wherein the plurality of resources located at the plurality of geographic locations include a virtual resource, and extracting a GPS coordinate for the virtual resource includes using a virtual GPS coordinate stored in a golden image of a hypervisor associated with the virtual resource.

8. The method of claim 7, comprising updating a tag for a portion of the resources located at the plurality of geographic locations in response to the portion of the resources migrating from a first geographic location to a second geographic location of the plurality of geographic locations.

9. The method of claim 8, wherein the first geographic location is a first geographical area of a first country and the second geographical location is a second geographical area of a second country.

10. The method of claim 7, comprising tagging migration information to the resources.

11. The method of claim 10, wherein the migration information includes previous geographic locations where the resources were stored.

12. The method of claim 10, wherein the migration information includes a timestamp that indicates a time when the resources were stored at previous geographic locations.

13. The method of claim 7, wherein each of the plurality of geographic locations include a policy corresponding to the geographic location.

14. A non-transitory computer readable medium storing instructions executable by a processing resource to cause the processing resource to:
   receive global positioning system (GPS) coordinates for a plurality of resources located at the plurality of geographic locations;
   tag resources located at each of the plurality of geographic locations with corresponding GPS coordinates;
   identify resources corresponding to an account; and
   extract GPS coordinates tagged to the identified resources corresponding to the account to generate a geographic map of the identified resources, wherein the plurality of resources located at the plurality of geographic locations include a virtual resource, and
   extracting a GPS coordinate for the virtual resource includes using a virtual GPS coordinate stored in a golden image of a hypervisor associated with the virtual resource.

15. The medium of claim 14, wherein the resources are tracked based on rules associated with each of the plurality of geographic locations.

16. The medium of claim 15, wherein the plurality of geographic locations includes a first geographic location conforming to a compliance policy corresponding to the first geographic location.

17. The medium of claim 15, wherein an alert is generated in response to the tagged resources violating a compliance policy.

18. The medium of claim 17, wherein the alert is sent to a user associated with a first portion of the resources when the first portion of the resources are violating a compliance policy associated with an account associated with the first portion of the resources.

19. The medium of claim 16, wherein a migration history of the first portion of the resources indicates a first portion of resources were moved to a second geographic location belonging to the plurality of geographic locations and a time when the first portion of resources were moved to the second geographic location.

20. The medium of claim 15, wherein the tagged resources include information including identification of the resource, date, and time the resource was identified in a particular geographic location.

* * * * *